United States Patent [19]

Mattis et al.

[11] Patent Number: 4,754,480
[45] Date of Patent: Jun. 28, 1988

[54] CIRCUIT ARRANGEMENT FOR TELECOMMUNICATION SWITCHING SYSTEMS CONNECTED TO LINE CONCENTRATOR SUB-EXCHANGES BY CONNECTING CHANNELS

[75] Inventors: Renate Mattis, Munich; Gerhard Renz, Martinsried; Guenther Seidel, Munich; Heinrich Übelhack, Oberhaching; Russell D. Homer, Munich, all of Fed. Rep. of Germany

[73] Assignee: Siemens Aktiengesellschaft, Berlin and Munich, Fed. Rep. of Germany

[21] Appl. No.: 833,302

[22] Filed: Feb. 25, 1986

[30] Foreign Application Priority Data

Apr. 3, 1985 [DE] Fed. Rep. of Germany ....... 3512274

[51] Int. Cl.⁴ ............................................. H04Q 3/60
[52] U.S. Cl. .................................. 379/279; 379/333; 379/334
[58] Field of Search .................... 379/279, 32, 33, 10, 379/11, 333, 334; 370/16

[56] References Cited

U.S. PATENT DOCUMENTS 4,197,427  4/1980  Hutcheson et al. ............ 379/279 X
4,455,645  6/1984  Mijioka ........................... 379/279 X
4,466,098  8/1984  Southard ......................... 379/279 X

FOREIGN PATENT DOCUMENTS 3224459  4/1985  Fed. Rep. of Germany .

OTHER PUBLICATIONS

Telcom Report, vol. 4 (1981), 71 pages.
Telcom Report 5 (1982), No. 4, pp. 262–266.

Primary Examiner—James L. Dwyer
Attorney, Agent, or Firm—Adel A. Ahmed; Thomas H. Jackson

[57] ABSTRACT

A concentrator equipped with two processors is connected via two corresponding channel systems to a higher ranking exchange. Both processors operate independently of each other and poll all subscriber line circuits for switching codes. In the event that a channel system malfunctions, but the concentrator processor is operational, one processor transmits request signals, as well as an emergency operating state signal, to the subscriber line circuits. If the processor itself malfunctions, it transmits request signals and, in addition, an out-of-order state signal. The emergency operating signal and out-of-order signal are stored by each of the subscriber line circuits. Switching codes are transmitted to each of the two processors when both of these processors are in standard operating mode or in emergency mode. If one of the processors is in emergency mode and the other in standard operating mode, or one of them malfunctions and is in out-of-order mode and the other is in emergency mode, the switching code is transmitted only to the latter processor in each case.

4 Claims, 1 Drawing Sheet

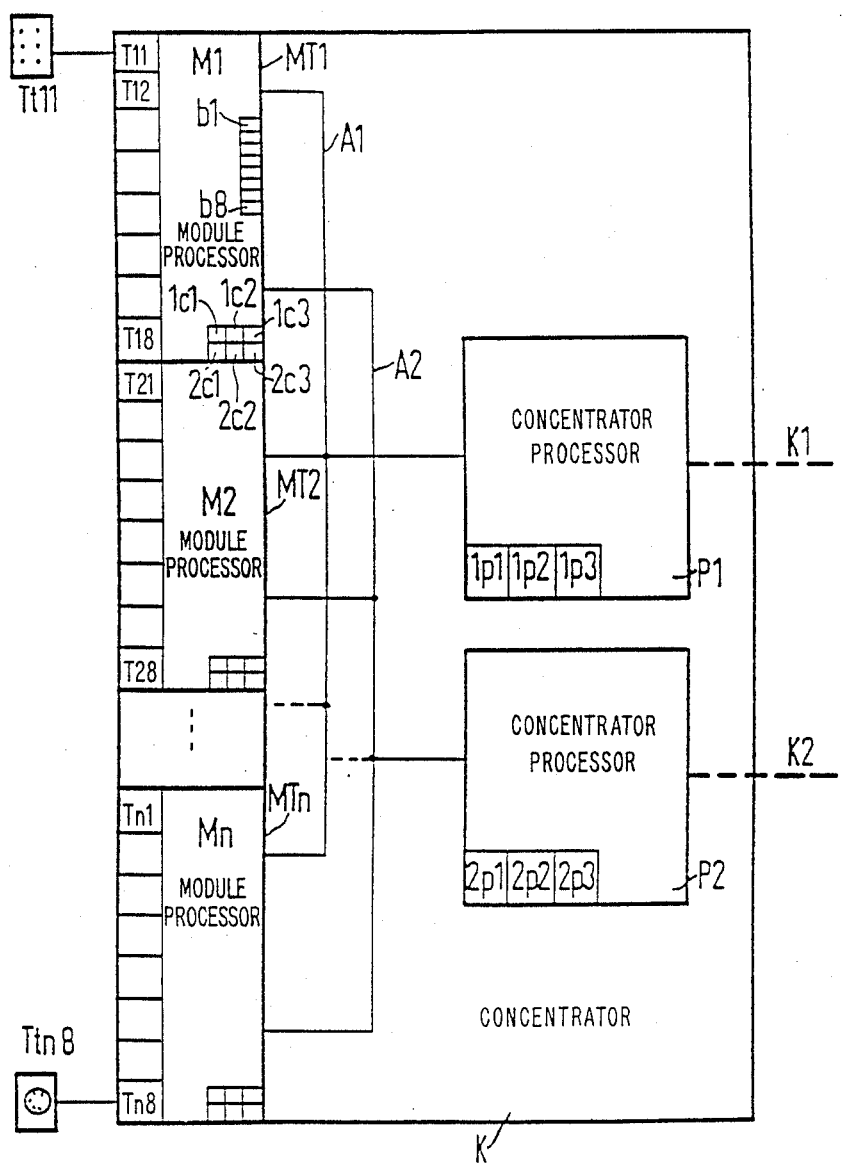

CIRCUIT ARRANGEMENT FOR TELECOMMUNICATION SWITCHING SYSTEMS CONNECTED TO LINE CONCENTRATOR SUB-EXCHANGES BY CONNECTING CHANNELS

BACKGROUND OF THE INVENTION

1. Technical Field

The invention relates to a circuit arrangement for telecommunication switching systems, in particular to concentrator sub-exchanges connected to a central control exchange via the seizable connecting channels of two channel systems which are independent of each other, and in which a given number of said connecting channels belong to two transmission systems which, respectively, are provided with a common transmission medium per system and two common terminals per system, and in which one of the channels of each of the two transmission systems is used as a control signal, and in which subscriber line circuits connected to the sub-exchanges are cylically selected by each of two independently operating processors, said processors being provided in the concentrator sub-exchange in question and assigned to one of the two transmission systems, and are scanned for switching codes received via the subscriber line, for example, initial identification codes indicating the start of an intended connection which is to be established, as well as selection codes, special codes, release codes, etc., and in which the processors, in the event of a malfunction of their respective transmission systems, adopt an emergency operating mode which differs from the standard operating mode.

2. Description of the Prior Art

A circuit arrangement of this type is already known from the German application of F. Hilliges, No. 3,224,459 C2 published Jan. 5, 1984. It shows, among other things, that in the event of a malfunction occurring in the two channel systems, an emergency mode is maintained in the concentrator sub-exchange by continuing to establish connections between the subscriber line circuits which are connected to the same concentrator. Therefore, the so-called island exchange operation is continued while only internal traffic is handled. In addition, it describes the operating mode of the two concentrator processors in the event that the channel system of one of the two processors is faulty, but that of the other is not. In this case, it is stated that one of the two processors handles only internal traffic (in accordance with the above "island exchange operation") and the other external traffic, i.e., via the channel system of this processor, which is still operative. As it is not clear when the circuit is initially seized (that is, every time a subscriber wishes to establish a call in the process of which the subscriber loop closes via its subscriber station) whether an internal or external connection is to be established, the known circuit arrangement specified in the above document provides that a data exchange take place between the two concentrators, so that a connection can always be established by the processor responsible during such an operating mode.

If the operation is to be highly un-susceptible to malfunction, it is practical for the processors to be so designed that they operate, as much as possible, independently of each other, so that a malfunction occurring in one of the two processors will not affect the other processor. It is thus advantageous to decouple the two processors from each other completely, so that they are able to function with total independence from each other. Moreover, the existence of two completely independent channel systems ensures that an adequate emergency mode can be adopted in the event that one of the two channel systems breaks down, while the other is still operative. In this connection, it is rather important that a processor whose channel system malfunctions may only handle island exchange traffic when it is no longer possible to establish connections via the higher ranking exchange. As, however, a reciprocal information exchange between the two processors is not to take place for the aforementioned reasons, in the case of a processor whose channel system malfunctions while the processor itself still is in working order, the problem arises of obtaining orientation assistance whereby the processor is either forced to perform or prohibited from performing island exchange operations.

It is the objective of the present invention that in a circuit arrangement of the type described above, the handling of the emergency operating state (island exchange operation) be accomplished without direct interaction of the two processors.

SUMMARY OF THE INVENTION

The invention solves the problems and related problems of the prior art based on the fact that the processors, when experiencing malfunctions, adopt a third or out-of-order state which differs from the standard operating state as well as from the emergency operating state; that each of the processors respectively signals its operating state to each subscriber line circuit when polling subscriber line circuits; that the subscriber line circuits store the operating state of each of the two processors; and that the subscriber line circuits present their switching codes to each of the two processors when both processors are in a standard operating state or when both processors are in an emergency operating state, that they present their switching codes only to the processor which is in a standard operating state when one of the two processors is in a standard operating state and the other is in an emergency operating state, and that they present their switching codes only to the processor which is in an emergency operating state when one of the two processors is in an emergency operating state and the other is in an out-of-order state.

Therefore, if a processor, during the selection of a subscriber line circuit, signals the standard operating state or the out-of-order state, the operating conditions presenting themselves are clearly such that said subscriber line circuit is either able or unable to present a switching code stored therein to the processor. However, if a processor, during the selection of a subscriber line circuit, signals the emergency operating state, the presentation of a switching code stored in the subscriber line circuit depends, each time, on whether the other processor is in a standard operating state, in an emergency operating state or in an out-of-order state. Since a direct information exchange between the two processors was purposely omitted, the operating state of each of the two processors at a point in time is stored in each subscriber line circuit. It can, therefore, be established, when a subscriber line circuit is selected by a processor which is in an emergency operating state, whether or not it has to present a switching code stored therein to said processor.

In accordance with a further development of the present invention, the subscriber line circuits are combined into multiple subscriber line circuits, each of which is provided with its own module processor which collects the switching codes of the subscriber line circuits belonging to a multiple subscriber line circuit; the module processors are selected individually and in succession by both processors and, at the same time, transmit the switching codes collected by the subscriber line circuits. By means of a module processor, the messages relating to operating states can be received jointly for the subscriber circuits of a multiple subscriber line circuit and be transmitted for storage, and by the same means the operating states of the two processors can be evaluated. The module processors enable preprocessing, collection and concentration of the individual switching codes received by the subscriber line circuits.

A further refinement of the above development of the present invention provides that suitable media for storing the operating state of the processors are provided jointly for the subscriber line circuits contained in a multiple subscriber line circuit. Consequently, when selecting a multiple subscriber line circuit, this will make it possible for subscriber line circuits combined therein to be evaluated jointly with the operating states of the two concentrators.

A further development of the invention is that the subscriber line circuits or module processors present only the initial codes to each of the two processors when both processors are either in a standard operating state or in an emergency operating state; that after an initial code has been transmitted from a subscriber line circuit to a processor, said initial code is stored in the processor which received said initial code, and that, on the basis of said storage, all other switching codes received from said subscriber line circuit are presented only to the same processor. In accordance with the development, the joint evaluation of the operating states of the two processors is thus limited to the arrival of the initial code. Further switching codes, which are received in the course of establishing a connection, are always presented to the processor which already has accepted the initial code in question.

BRIEF DESCRIPTION OF THE DRAWING

The drawing illustrates an embodiment of the invention serving essentially for the understanding of the components shown, but which is not limited thereto.

DETAILED DESCRIPTION

The description is based on the assumption of a known telecommunication switching system in which at least one sub-exchange is connected to a central control exchange via the seizable connecting channels of two channel systems, which are independent of each other. The assumption is made that telecommunication switching systems of this type, in which the sub-exchange are concentrators, are known. In this connection, reference is made to the magazine "telecom report", supplement 1981, and especially to the issue 4/82 (English language version). In these relatively old publications it is explained that the connecting channels of a concentrator are combined in two transmission systems which, respectively, are provided with a given number of connecting channels. In the known cases, these transmission systems are digital pulse code modulated (PCM) systems. However, these may also be analog carrier frequency systems, timed division multiplex (TDM) systems, or similar systems of a different type. In the known cases, each of the two transmission systems per concentrator is provided with a common transmission system per system and, respectively, two common terminals per system. One of the channels of each of the two transmission systems is used as a control signal channel between the concentrator, on the one hand, and the higher ranking exchange, on the other hand. All these technical features of the known telecommunication switching systems also apply to the embodiment of the invention detailed in the drawing described further below.

The drawing simply shows a section of a concentrator. The two above-mentioned channel systems K1 and K2 are shown with dotted lines. They lead to a higher ranking telephone exchange (it can also be a different type of telecommunication switching system, e.g., a telex exchange, etc.) which is not detailed in the drawing, but can be inferred from the above-mentioned old publications.

The drawing further shows a number of subscriber stations Tt11–Ttn8 which are connected to a concentrator K. These subscriber stations may be push-button or tone signaling subscriber stations, e.g. Tt11, as well as dial switch or pulse signaling subscriber stations, for example, Ttn8. A subscriber line circuit T11 through Tn8 is provided for each subscriber station. The subscriber line circuits are combined in groups of eight into multiple subscriber line circuits. For example, the group of subscriber line circuits T11 through T18 forms one multiple subscriber line circuit. This also applies, correspondingly, to the other groups of subscriber line circuits, e.g. Tn1 through Tn8, shown in the drawing.

As can be understood from the above-mentioned old publications, the subscriber line circuits of the subscriber exchanges connected to the sub-exchanges are cyclically selected by each of the two independently operating processors which are provided in the sub-exchange in question and assigned to one of the two transmission systems. These subscriber line circuits are scanned by the processors for selection codes, including, e.g. initial codes indicating the start of an intended connection that is to be established. They are also provided with control commands, which said subscriber lines circuits receive in connection with the corresponding polling processes. As in the known cases, the sub-exchanges shown in the drawing are, as mentioned above, concentrators. The concentrator processors P1 and P2 are connected by a known method with the higher ranking exchange via the two independent channel systems K1 and K2, that is to say, with a central controller provided in said exchange.

As can be understood from the drawing, the subscriber line circuits T11-Tn8 are combined into multiple subscriber line circuits consisting of eight multiple subscriber line circuits each. Each muliple subscriber line circuit, for example T11-T18, is equipped with its own module processor, for example, M1.

The module processor, e.g. M1, of a multiple subscriber line circuit, e.g., MT1, scans one by one, by a known method, the individual subscriber line circuits, e.g., T11-T18, of the multiple subscriber line circuit in question. In doing so, the module processor records any changes in the switching status of each of the subscriber lines. Each of the module processors, e.g., M1 has a storage unit b1-b8, which contains one storage unit, e.g., b1, for each subscriber line circuit, e.g., T11. The number of storage units provided equals that of the subscriber line circuits per multiple subscriber line circuit. Each storage unit consists of a multitude of storage cells. All line statuses occurring sequentially are stored per subscriber line circuit. In the event of changes occurring in the line status, a comparison of the newly determined scanning result with a previously stored result will be identifiable. These processes are generally known. The module processor of a multiple subscriber line circuit thus determines all switching codes received per subscriber line circuit. These switching codes can be in the form of selection codes, initial codes, and other types of switching codes, for example, facility codes. An initial code is defined as a switching code which indicates the start of an intended connection. In subscriber stations with loop pulse discharge, the initial code consists, for example, in the subscriber loop being closed, which is also defined as a "calling signal" or a "subscriber call."

The module processor, e.g. M1, of a multiple subscriber line circuit thus processes and concentrates data, while reconstructing initial codes, selection codes, and other switching codes in accordance with the known "last look" principle, which are determined from the individual switching status of each of the subscriber line circuits during sequential polling processes. These codes are obtained by the module processor by means of the storage units b1-b8 and are then available for recall in the corresponding sections of said storage unit.

The multiple line circuits are sequentially scanned by the two concentrator processors P1 and P2. At this time, a multiple line circuit will only be selected by one of the two processors. As for the rest, the two processors operate independently of each other. Each of the two processors has its own line or bus access system. This, for example, is shown as the two bus systems A1 and A2. Thus, each of the two concentrator processors is connected with each of the multiple subscriber line circuits MT1-MTn via its respective bus system. Each of the two processors individually selects, one by one, each of the multiple subscriber line circuits. Each of the two processors thus exchanges data during a particular moment with only one of the two multiple subscriber line circuits.

In order to accomplish such a single selection, each of the module processors M1-Mn is equipped with suitable bus interfacing means. The interface connection is performed by a known method by selecting one multiple subscriber line circuit, e.g., MT1, by means of an address assigned individually to said circuit. All multiple line circuits thus have their own respective addresses. In order to select a multiple line circuit by one of the two concentrator processors, said processor first signals the address via its bus system, whereupon, as known, the respective selected multiple line circuit so reacts that the interfacing means contained therein is activated.

Each of the two concentrators can assume several different operating states. In a standard operating state, a concentrator, e.g., P1, including the channel system assigned to said concentrator, e.g., K1, can become fully operative. If a malfunction occurs in the channel system, e.g., K1, of a processor, e.g., P1, which is recognizable by the processor in question, the standard operating state changes to an emergency operating state, which differs from the standard operating state. This, then, indicates that the channel system in question is malfunctioning, but not the processor itself. Moreover, a processor can also adopt a third or out-of-order state. In such a case the processor's own functions are affected by a malfunction. In the event of an out-of-order state, however, a concentrator processor may continue its cyclical polling processes with the module processors of the multiple subscriber line circuits.

If one of the processors is in a standard operating state, it automatically recognizes a malfunction occurring in a channel system assigned to said processor. If, however, a malfunction occurs in the processor itself, said malfunction will be recognized by the central controller of the higher ranking telephone exchange and signaled to the concentrator processor in question. A message is also transmitted to the processor when said processor returns from an out-of-order state to a standard operating state. This message is transmitted via the channel system assigned to the respective concentrator processor.

The respective operating state of a concentrator processor, e.g., P1, is stored in the relevant storage elements 1p1-1p3 or 2p1-2p3. With the processor P1, the storage element 1p1 can serve for storing the standard operating state. The storage element 1p2 can serve for storing the emergency operating state, and the storage element 1p3 for storing the out-of-order state.

Each of the two concentrator processors, when selecting a module processor, now signals an individual operating state to each of these module processors. Thus, the respective operating state of each of the two concentrator processors is signaled to each of the subscriber line circuits of a multiple subscriber line circuit. Of the two concentrator processors, that operating state which the respective processor has signaled to the relevant multiple subscriber line circuit during the last selection process is stored by the subscriber line circuits of a multiple subscriber line circuit in the module processor of said subscriber line circuit. In the module processor M1, the storage elements 1c1, 1c2 and 1c3 serve, in this sequence, for storing the standard operating state, emergency operating state, and out-of-order state of the concentrator processor P1 respectively. Correspondingly, the storage elements 2c1-2c3 serve for storing the operating states of the processor P2. Consequently, when a continuous cyclical selection of the module processors of the multiple subscriber line circuits is performed by the concentrator processors, the respective operating states of each of the two concentrator processors are stored in the individual module processors. The same applies correspondingly to the other module processors of the remaining multiple subscriber line circuits.

If one of the concentrator processors, e.g., P1, has selected one of the multiple subscriber line circuits, e.g., MT1, this circuit will be used for scanning its module processor, e.g., M1, for initial codes, selection codes and other switching codes. The relevant module processor then transmits codes of the above type, which have been stored per subscriber line circuit in said module processor, to the respective selected concentrator processor. This however, depends on the operating states of the two concentrator processors at a certain point in time. If both processors are in a standard operating state, the relevant module processor, after it has been selected by the concentrator processor, transmits the above type of signals which are stored in the module processor per subscriber line circuit. Thus, each of the two concentrator processors gathers other types of initial codes, as well as selection codes and switching codes, from all multiple subscriber line stations. If, however, one concentrator processor, which is in the process of selecting a multiple subscriber line circuit, is an emergency operating state, while the other processor is in a standard operating state, the module processor of the relevant multiple subscriber line circuit does not present the available switching code to the concentrator processor which is in the process of selecting said multiple subscriber line circuit. A transmission of these switching codes to the concentrator processor which is an emergency operating state will not occur.

If one of the concentrator processors is in the aforementioned emergency operating state, it can operate in a before described emergency mode. This mode is described in reasonable detail in the aforementioned German disclosure document No. 3,224,459 02. A concentrator processor can operate in this "island" mode when the channel system assigned to said processor is malfunctioning, but the processor itself is operational. In this case, it can handle internal traffic, that is to say, it can establish, maintain and release connections between two subscriber exchanges that are connected to one and the same concentrator. For this purpose, each of the concentrator processors is equipped in the usual manner with the necessary equipment (for example, selection receivers, signal generators, etc., not shown in the drawing). During this particular operating mode, the working mode of a concentrator processor, as well as the entire cycle of its functional processes, differs from the standard operating mode.

If one concentrator processor is in an emergency operating state, this does not mean that said processor will also operate in emergency mode. If only one of the two processors is in an emergency operating state, said processor will not operate in emergency mode; instead, the unaffected processor alone will handle the entire switching traffic. Although this results in a considerable reduction of traffic capacity of the processor, it enables the standard operation to be continued, while all subscriber line circuits connected to the relevant concentrator have equal operational availabilities.

If, therefore, one concentrator processor is in an emergency operating state, the actual performance of emergency operations depends on whether the other processor, too, is in an emergency operating state, or in an out-of-order state. If the other processor is in a standard operating state, each of the module processors of the various multiple subscriber line circuits presents the switching codes, which are ready for transmission, to one of the concentrator processors, but only to the processor which is in a standard operating state; thereofre, these switching codes are transmitted only to said processor and not to the one which is in an emergency operating state.

If both concentrator processors are in an emergency operating state, they present their switching signals to the two concentrator processors. The switching signals can thus be transmitted to one or the other processor.

If one of the concentrator processors is in an emergency state and the other is an out-of-order state, each module processor will present its switching codes only to the concentrator processor which is in an emergency operating state. The switching signals are thus transmitted only to said processor by the various module processors.

As has been explained, a concentrator processor changes from normal operating state to emergency operating state when its channel system is malfunctioning. Apart from this, it is possible for this change in operating mode to be performed as well when the central controller of the higher ranking exchange, to which the various concentrators are connected, is switched off. In this case, all the concentrator processors connected to all the concentrators would adopt the emergency operating state together. Such a change in operating mode can also be effected like the above change in operating mode, provided that the signal channels of the concentrator processors assigned to the channel system are connected through via the central switching matrix of the higher ranking exchange to their central controller, when the central switching matrix of the higher ranking exchange is switched off due to malfunctions.

The out-of-order state of a concentrator processor can take on different dimensions as the case may be. The out-of-order state can be limited to the fact that specific processing processes are not performed properly, but that the concentrator processor which is in an out-of-order state still selects the various module processors of the multiple subscriber line circuits. If this is the case, it is provided, as described above, that when a module processor is selected by a concentrator processor which is in an out-of-order state, said processor identifies itself automatically as being in an out-of-order state and thus transfers the relevant signal to the respective scanned module processor. This then is followed by a corresponding storage in the corresponding storage element, e.g., 1c3 or 2c3, assigned to the respective concentrator processor. The out-of-order state of a concentrator processor can, however, be such that it no longer performs any selections. Such a concentrator processor is identified by the module processors, because the relevant concentrator processor no longer performs any selections. Normally, selection takes place at specific minimum intervals. If a concentrator processor is affected by such a total malfunction, this can be detected by a module processor, because during the period, which corresponds to that required for normal scanning by a concentrator processor, no scanning processes are performed by said processor. For this purpose, each module processor is equipped with a timing device, not shown, per concentrator processor. By means of this timing device, each module processor can monitor the regularity of the scanning processes of each of the concentrator processors.

If, then, a module processor thus identifies the out-of-order state of one of the concentrator processors, which consequently is unable to continue its polling processes, the relevant module processor stores the out-of-order state of the respective concentrator processor in the manner described above.

If one of the concentrator processors, e.g., P1, has selected one of the multiple subscriber line circuits, e.g., MT1, said processor scans, by means of said line circuit, the module processor, e.g., M1, of this multiple subscriber line circuit for initial codes, selection codes, and other switching codes. The relevant module processor thereupon transmits the aforementioned types of codes, which are stored per subscriber line circuit in said processor. Thus, each of the two concentrator processors gathers initial codes, as well as selection codes and switching codes of another type, from all multiple subscriber line circuits. Care is taken that initial codes, selection codes and other switching codes, which have already been scanned by a multiple subscriber line circuit or its module processor using a known method not described herein, are not scanned for a second time by another concentrator processor. In this connection, it can be provided that, after an initial code has been received from a certain subscriber station by a subscriber line circuit, additional information is stored in the memory of the respective module processor for the subscriber line circuit allocated to it, the additional information identifying to which of the two concentrator processors the initial code has been transmitted. Said storage of the initial code takes place in those storage units assigned to the respective subscriber line circuit within the relevant multiple subscriber line circuit. What this storage achieves is, that after the initial code has been transmitted, a subscriber line circuit is and remains assigned to one of the respective concentrator processors for the period during which a connection is established, until said connection is released. If, therefore, an initial code transmitted by a specific subscriber has been accepted by one of the two concentrator processors, all other selection codes and switching signals relevant to establishing the respective connection are thus accepted only by the same concentrator processor. The concentrator processors retransmit, in a known manner, the initial codes, selection codes and other switching codes accepted by the multiple subscriber line circuits and other individual subscriber line circuits to the central controller of the higher ranking telephone exchange.

As can be seen from the above description, when initial codes reappear, it is still undecided by which of the two concentrator processors said codes will be accepted. As was explained, the two processors operate independently of each other. If there is a recurrence of an initial code from a subscriber exchange in the subscriber line circuit assigned to said exchange and the code reappears in its relevant storage unit, it will be called in and accepted by the first concentrator processor which selects the relevant multiple subscriber line station. This is essentially a random selection.

However, the occasion may arise where all channels of a channel system, e.g., channel system K1, are busy. These channels may be busy on account of established connections as well as those which are still in the process of being established. There may therefore, be connections for which not all of the digits of a multi-digit subscriber number have been transmitted. In order to establish connections of this type, the required selection codes are, yet, to be transmitted. In the given example, this is still to be accomplished by the concentrator processor P1. Said processor thus must continue to scan and accept selection codes and other switching codes from the multiple subscriber circuits or the module processors assigned to said circuits.

As, in the above example of operation, all of the channels of the channel system K1 have already been set up, it would be unnecessary if the concentrator processor P1, while in this state, would in addition recall and accept the initial codes. It is provided, therefore, that when all channels of one of the two transmission systems are busy, the concentrator processor P1 assigned to the relevant transmission system transmits, in connection with the selection, a reject code to each module processor. Therefore, if the concentrator processor P1 is, for example, in process of selecting the module processor M1, it thus requests a transfer of codes which are stored in the individual storage units of said module processor. The reject code thus transmitted by the relevant concentrator processor P1 to the relevant module processor causes the existing initial codes to be not transmitted to said processor, whereas transmissions of selection codes from the module processor to the concentrator processor will remain unaffected. If a module processor thus receives a reject code from the concentrator processor, the module processor transmits to the concentrator processor only the selection codes and other switching codes, but not the initial codes, from the initial codes, selection codes and other switching codes stored in the storage unit of the module processor. This has the effect that new line occupancies can only be accepted via channels of the channel system in which at least one channel is vacant. New line occupancy is defined as the start of a new connection during which an initial code is formed, and in the course of which a vacant channel of the channel system assigned to the concentrator processor is occupied in the concentrator of the relevant concentrator processor.

Thus there has been shown and described a novel third or out-of-order state of a concentrator connected to a hiearchally higher telephone exchange and the advantages of providing a circuit arrangement structure for providing such a third state, only to be considered to be limited in scope of invention by the claims which follow.

What is claimed is:

1. A circuit arrangement for telecommunication switching systems, including exchanges, in which at least one sub-exchange is connected to a central control exchange via the seizable connecting channels of a two channel system which are independent of each other, and in which a given number of said connecting channels belong to two separate transmission systems which, respectively, are provided with a common transmission medium per system and two common terminals per system, and in which one of the channels of each of the two transmission systems is used as a control signal, and in which subscriber line circuits of subscriber lines are connected to the sub-exchange and are cyclically selected by each of two independently operating processors, said processors being provided in the subexchange and assigned to one of the two transmission systems, and are scanned for switching codes received via the subscriber line, which include one or more codes including, initial codes indicating the start of an intended connection which is to be established, as well as selection codes, special codes, and release codes, and in which the processors, in the event of a malfunction of their respective transmission systems, adopt an emergency operating mode which differs from the standard operating mode, characterized in that the subexchange processors, when experiencing malfunctions, adopt a third or an out-of-order mode which differs from the standard operating mode as well as the emergency operating mode; that each of the subexchange processors respectively signals a state signal indicating its operating mode to each subscriber line circuit when selecting subscriber line circuits; that the subscriber line circuits store the operating mode of each of the subexchange processors; and that the subscriber line circuits present their switching codes to each of the two sub-exchange processors when both processors are in a standard operating mode or when both processors are in an emergency operating mode, the subscriber line circuits presenting their codes only to that processor which is in a standard operating mode, when one of the two processors is in a standard operating mode and the other in an emergency operating mode, and presenting their switching codes only to the processor which is in an emergency operating mode, when one of the two processors is in standard operating mode and the other in an out-of-order state.

2. A circuit arrangement as defined in claim 1 further characterized in that the subscriber line circuits are combined into multiple subscriber line circuits, each of which is provided with its own module processor which collects the switching codes of the subscriber line circuits belonging to a multiple subscriber line circuit; and that the module processors are selected individually and in succession, and, at the time of selection, transmit the switching codes collected by the subscriber line circuits.

3. A circuit arrangement as defined in claim 1 further characterized in that suitable storage media for storing the operating state of the subexchange processors are provided jointly for the subscriber line circuits contained in a multiple subscriber line circuit.

4. A circuit arrangement as defined in claim 1 further characterized in that the subscriber line circuits or module processors only present the initial codes to each of the two subexchange processors when both processors are in a standard operating mode or when both processors are in an emergency operating mode; that after an initial code has been transmitted from a subscriber line circuit to a subexchange processor, said initial code is stored in the processor which received said initial code, and that, on the basis of said storage, all other switching codes received from said subscriber line circuit are presented to the same processor only.

* * * * *